United States Patent
Vrachan et al.

(10) Patent No.: US 8,279,268 B2
(45) Date of Patent: Oct. 2, 2012

(54) PROJECTION SYSTEM WITH WALL STRUCTURES FOR AERIAL DISPLAY OF THREE-DIMENSIONAL VIDEO IMAGES

(75) Inventors: Jeffrey L. Vrachan, Agoura Hills, CA (US); Curtis L. Thornton, Simi Valley, CA (US)

(73) Assignee: Provision Interactive Technologies, Inc., Chatsworth, CA (US)

( * ) Notice: Subject to any disclaimer, the term of this patent is extended or adjusted under 35 U.S.C. 154(b) by 1382 days.

(21) Appl. No.: 11/843,115

(22) Filed: Aug. 22, 2007

(65) Prior Publication Data
US 2008/0049151 A1   Feb. 28, 2008

Related U.S. Application Data

(60) Provisional application No. 60/839,740, filed on Aug. 23, 2006.

(51) Int. Cl.
*H04N 13/04* (2006.01)
(52) U.S. Cl. .......................................... 348/51
(58) Field of Classification Search ............ 348/51; 353/10, 7, 28, 31, 74, 98, 119; 359/478
See application file for complete search history.

(56) References Cited

U.S. PATENT DOCUMENTS

| | | | |
|---|---|---|---|
| 4,802,750 | A | 2/1989 | Welck |
| 5,311,357 | A | 5/1994 | Summer et al. |
| 5,552,934 | A | 9/1996 | Prince |
| D435,043 | S | 12/2000 | Hines |
| 6,808,268 | B2 | 10/2004 | Vrachan et al. ............. 353/10 |
| 2003/0053033 | A1 | 3/2003 | Vrachan et al. ............. 353/31 |

*Primary Examiner* — Robert B Harrell
(74) *Attorney, Agent, or Firm* — J.C. Patents

(57) ABSTRACT

An aerial projection system and method having a housing for positioning low cost optical elements capable of generating a three dimensional aerial images at video rates without reflected artifacts or visible display of the display screen. A method for generating the display images is based on a set of rules that eliminate boundary transgressions and maximizes the illusion of a three dimensional aerial image. An optional second display is a transparent imaging panel that acts selectively as a light valve, as a display platform for special effects or for providing the appearance of linear motion towards or away from the observer. The aerial projection system includes a plastic spherical mirror having a plastic part of at least the following descriptions: mirror surface of sufficient sphericity supported by wall structures, of a plastic material formulation, excellent optical grade finish, has a reflective metal coating and a protective overcoat.

19 Claims, 11 Drawing Sheets

PROJECTION SYSTEM WITH WALL STRUCTURES FOR AERIAL DISPLAY OF THREE-DIMENSIONAL VIDEO IMAGES

CROSS-REFERENCE TO RELATED APPLICATION

This application claims the benefit of U.S. Provisional Application No. 60/839,740, filed Aug. 23, 2006. This is a corresponding application of U.S. Pat. No. 6,808,268. The entirety of each of the above-mentioned patent applications is hereby incorporated by reference herein and made a part of this specification.

BACKGROUND OF THE INVENTION

1. Field of the Invention

The present invention relates to a projection system for the display of aerial images and more particularly, to a projection system for displaying three-dimensional video images having a low-cost plastic spherical mirror.

2. Description of Related Art

Aerial image projection systems are known in the art. Such systems utilize a plurality of optical elements such as mirrors, Fresnel lens and optical filters or polarizers to project an image of an object into space. The optical elements and the object are positioned in a housing to define an optical path. Depending on the arrangement and selection of the optical elements, the projected image is visible either within the dimensions of the housing or a short distance in front of the housing. Examples of aerial projection systems include U.S. Pat. No. 5,311,357, issued May 10, 1994, U.S. Pat. No. 5,552,934, issued Sep. 3, 1996, U.S. Pat. No. 4,802,750, issued Feb. 7, 1989, and U.S. Pat. Des. No. 435,043 issued Dec. 12, 2000.

Prior art aerial projection systems are expensive because of the cost of optical components required to project the aerial image of an object. More specifically, such systems use one or more concave glass mirrors in the optical path together with one or more glass polarizers maintained in a fixed orientation with respect to a stage where an image is positioned. Unfortunately, 15-inch concave glass mirror or spherical mirror costs well over $1,000 and polarizers cost about $850. Clearly, glass spherical mirrors and polarizers are major contributors to the high cost of the prior art aerial projection system. Not only expensive, these glass spherical mirrors and polarizers are also very heavy so adequate support must be provided. Accordingly, a heavy box-like housing is used to maintain the orientation of the optics with respect to the object.

As mentioned above, glass has been the conventional material of choice for use as the spherical mirror. One of the most important reasons is because plastics technologies were not as developed as they are today. In other words, the tools and materials were not available as they are today. The metal mold tolerances and the resulting parts can be specified and held in the tens of thousandths of an inch. Materials used today are more sophisticated; the plastics are able to emulate the thermal stability and durability similar to that of glass, and to endure the type of operating conditions in the past that only glass could have tolerated.

Furthermore, the glass spherical mirrors are expensive because of the secondary operations needed to prepare the mirror surface after it is heat formed or slumped to shape. These secondary operations include annealing, grinding and polishing. The annealing process is used to strengthen the glass so that it is strong enough to undergo the grinding and polishing operation, as well as adding the additional strength needed to resist breakage during usage. The grinding and polishing stages are necessary because of the limits of the tolerance capabilities of glass forming molds and the physical nature of glass. Unfortunately, the grinding and polishing stages require a considerable amount of manual processing for producing a finished product; therefore, they are often considered semi-automated processes.

In addition, glass also has the serious drawbacks of breakage, weight, and expensive shipping costs. To try to overcome the limitations and drawbacks of glass, a low-cost glass forming process was developed. However, the low-cost glass forming process did not provide an acceptable surface finish, and the resulting cost reductions were not comparable to that of plastic. Clearly, what is needed is a method and system for manufacturing a plastic part to reduce the weight of a spherical mirror to approximately one-third that of glass, and for making a low-cost plastic spherical mirror of comparable performance to glass spherical mirror. As a result, an aerial projection system that is lightweight, inexpensive and easily transported from one location to another can then be realized.

While prior art aerial projection systems generate visually captivating aerial images, there are a number of problems that limit use of aerial projection systems in a wide variety of applications. Accordingly, prior art aerial projection systems are typically used in museums or retail stores to display expensive items where the object being displayed can be kept safely out of the reach of the observer.

Prior art aerial projection systems typically use a three-dimensional object as the source of the image. For example, a small statue may be placed on a pedestal and brightly lighted with spotlights. The three-dimensional image of the statue is projected through a display window and viewed by observers who are positioned in front of the display window as if it were floating in air.

One problem with using an object as the source of the projected image is the difficulty and expense associated with changing the image. Thus, to maintain the viewer's interest and to preserve the novelty of the projected image, the object must be constantly changed. This is a labor-intensive process as an attendant must open a door in the housing, remove the object, position a new object and verify that it is properly positioned on the display pedestal.

To overcome this limitation, aerial display systems have attempted to utilize a video display device instead of a physical object as the image source. Unfortunately, the video images appear together with an image of the display screen. Thus, rather than displaying a floating image, the aerial image appears to the observer as a floating video display screen thereby rendering the illusion of an image floating in air ineffective. What is needed is an aerial projection system capable of displaying video images without the video display screen being visible to the observer.

Another problem associated with the display of video images arises from the display device itself. Specifically, video monitors use a flat piece of optical quality glass behind which the image is generated. This glass tends to reflect external images that pass through the optics in the optical path. The reflected image is viewable by the observer resulting in a noticeable double aerial image. Clearly, what is needed is an aerial projection system that eliminates reflected images from the displayed aerial image.

Yet another problem with prior art display of video images arises when the object of attention moves off screen. More specifically, when an image transgresses beyond a boundary of the display, the observer immediately detects the edge condition and the illusion of a floating image is lost. Accordingly, what is needed is a method for displaying an aerial image in a manner that does not suggest that the image is generated by a video display.

Thus, a better system and method for projecting aerial images is needed. More specifically, what is needed is an aerial projection system for projecting images at video rates that is lightweight and inexpensive.

SUMMARY OF THE INVENTION

The present invention relates to an aerial projection system and method. More specifically the present invention relates to an aerial projection system having a housing for positioning low cost optical elements including a plastic spherical mirror capable of generating a three dimensional aerial image that is projected outside the dimensions of the housing and that is visible to an observer in ambient light conditions. The system is capable of displaying three-dimensional aerial images at video display rates without reflected artifacts or visible display of the display screen. The method incorporates a set of rules to eliminate boundary transgressions and to maximize the illusion of a three dimensional aerial image.

In one preferred embodiment, the system of the present invention includes a plastic spherical mirror which is concave and is positioned opposite in the housing. A planar plastic beam splitter is positioned in front of the plastic spherical mirror. The beam splitter is preferably oriented at a forty-five degree (45.degree.) angle relative to the face of the plastic spherical mirror. To minimize glare and reflections, a polarizer is affixed closely proximate to the beam splitter. The polarizer is preferably aligned parallel to the beam splitter. In addition, a method and system for manufacturing a low-cost plastic spherical mirror of comparable performance as that of a glass spherical mirror is included in the preferred embodiment. In the preferred embodiment, plastic injection molding is used for manufacturing the plastic part for a low-cost plastic spherical mirror. The injection molding method is able to yield higher tolerance, improved process control, and higher repeatability. The metal mold for the injection molding is able to hold a tight tolerance for a general envelope dimension for a mirror (not the mirror surface). The spherical radius tolerance is also able to be held at a tight tolerance. The aforementioned tolerances are comparable to that of the glass spherical mirrors. A metal mold for injection molding is able to hold to a tight tolerance. In the preferred embodiment, a plurality of plastic material formulations have been developed in which a plurality of performance criteria relating to material strength, thermal stability, water absorption, mold shrinkage, material flow into the mold, UL recognition, manufacturing considerations, surface density, lubricant content, and scratch resistance are met. The selection of the plastic material formulation may be based on the metal mold and part testing results.

In the preferred embodiment, vacuum metallization or vacuum deposition may be used for depositing a reflective mirror coating for use as the mirror surface for the spherical mirror. The metal deposited on the plastic surface is preferably at a thickness of several microns. The metalizing phase is performed following by a protective overcoat being sprayed onto the metalized surface. The vacuum metalized part is to have sufficient quality because of improved quality control of the surface of the plastic material that is being coated by means of the ability to minimize the amounts of flaws on the plastic surface resulting from the molding process.

A method according to the embodiment of the present invention for fabricating a plastic spherical mirror include the following steps:

a) The plastic part is designed so that a mirror surface is supported for the prevention of distortion or twisting;

b) The plastic injection gates are precisely placed for ensuring the elimination of remnants or knit lines created by plastic resin flow;

c) A preferred physical size of the plastic part for satisfying a plurality of optical performance requirements and physical design requirements is selected;

d) A plurality of support walls are formed and strategically placed in the plastic part;

e) A plastic material formulation is selected so that it is specifically designed to resist deformation;

f) The tool may also be made from a preferred grade of steel having a preferred polished finish;

g) The metal mold is to be heated and/or chilled to form an optimal curvature on a mirror surface;

h) A thin layer of a reflective metal coating is deposited onto the mirror surface of the plastic part; and i) A protective overcoat is formed onto a metalized mirror surface.

By performing the above method for fabricating the plastic spherical mirror, a plastic spherical mirror which includes the following is fabricated: a plastic part having a mirror surface supported by a plurality of wall structures onto the edge of a mirror edge, a preferred physical size for the plastic part, a plastic material formulation, an excellent optical grade finish formed by polishing the mirror surface for a metal mold, an optimal curvature of the mirror surface produced by means of heating and chilling the metal mold, a thin layer of a reflective metal coating deposited onto the mirror surface of the plastic part, and a protective overcoat formed onto a metalized mirror surface. Furthermore, in the preferred embodiment, the plastic spherical mirror may further include a plurality of injection gates at a plurality of strategic locations and a preferred physical size for the plastic part. Additionally, a plurality of support walls may be disposed in the plastic part so that the final design dimensions of the plastic part are to match that of a glass counterpart in the preferred embodiment.

An improved high-bright liquid crystal display (HLCD) device is positioned proximate to the beam splitter such that the beam splitter projects images onto the mirror and then out through the polarizer. A computer system, coupled to the HLCD device, provides a source of images for display at video rates. The computer system may drive a single HLCD display or a plurality of displays. Novel features of the HLCD device and the method for presenting images eliminate projection of an observable boundary. Images displayed on the HLCD device comply with a set of display rules so that the observer is not presented with display incongruities that would ruin the illusion of a floating aerial image. Specifically, the rules limit the movement of displayed objects beyond the edge or boundary of the HLCD device and limit background colors that would cause the edge of the HLCD device to become visible. Accordingly, movement of displayed objects is in accordance with selected techniques.

In another preferred embodiment, the computer system is coupled to a communication network so that an image sequence is transferred to the computer system from a remote location for display. The communication enables the observer to request additional information or to select the display of a different sequence of video.

In yet another preferred embodiment, a second display is provided proximate to the HLCD display. This second display is preferably a transparent imaging panel that acts selectively as a light valve, as a display platform for special effects or for providing the appearance of linear motion towards or away from the observer.

In yet another preferred embodiment, a third display device is provided at the portal. The third display device is also preferably a transparent imaging panel that is used as a background display device for displaying video rate images that are not projected aerial images. Thus, the observer is presented a rich and varied display environment where the background display is combined with projected images. With the three display devices, the observer is actively engaged in viewing a dynamic, realistic video event.

The present invention further includes a method for generating and displaying three-dimensional aerial images using the above described system. The method includes a set of software development tools for crafting and positioning three-dimensional images on the first and second displays so that an observer perceives three-dimensional images floating in space without detecting the boundary of the displays. The software development tools further include logic for developing a sequence of video rate aerial images.

DESCRIPTION OF THE DRAWINGS

The above and other features and advantages of the present invention will become more apparent by describing in detail exemplary embodiments thereof with reference to the attached drawings in which.

DETAILED DESCRIPTION

In the following description of a preferred embodiment, reference is made to the accompanying drawings, which form a part hereof, in which is shown by way of illustration specific embodiment in which the invention may be practiced. In the following description, numerous specific details are set forth in order to provide a complete understanding of the present invention. It will be apparent to one skilled in the art that the present invention may be practiced without the specific details. In the development of the actual implementation, numerous implementation-specific decisions must be made to achieve the design goals that will vary for each implementation. Accordingly, in order not to obscure the present invention, well-known structures and techniques are not shown or discussed in detail.

The present invention relates to an aerial display system and method for display of computer-generated three-dimensional video images. More particularly, the present invention relates to an improved system and method for displaying three-dimensional video images without a visible image of the display screen. In the following description of the preferred embodiment, reference is made to the accompanying drawings that form a part hereof, and in which is shown by way of illustration a specific embodiment in which the invention may be practiced. It is to be understood that other embodiments may be utilized and that changes may be made without departing from the scope of the present invention.

For the sake of convenience of understanding, some key terms and phrases are first presented.

A "plastic material formulation" may comprise of a homopolymer, a thermoplastic, a copolymer, a polymer blend, a thermoset, a polymer blend, any one of the above material containing performance additives, fillers, or fibers, or any other similar types of polymer material formulations.

The "depositing of a reflective metal coating onto the mirror surface of the plastic part" may be accomplished by vacuum deposition, spin coating, spraying, vacuum metallization, sputtering, or any other similar systems capable of depositing the reflective metal coating on the order of several microns.

"Low-cost" may be defined as a favorable cost differential as compared to glass of the same dimensional configuration for use as spherical mirrors.

A "glass counterpart" is defined to be a glass spherical mirror of the same dimensional configuration and possesses equivalent functionalities as that of the plastic spherical mirror.

As used herein, the words "may" and "may be" are to be interpreted in an open-ended, non-restrictive manner. At minimum, "may" and "may be" are to be interpreted as definitively including structure or acts recited.

Figure 1:
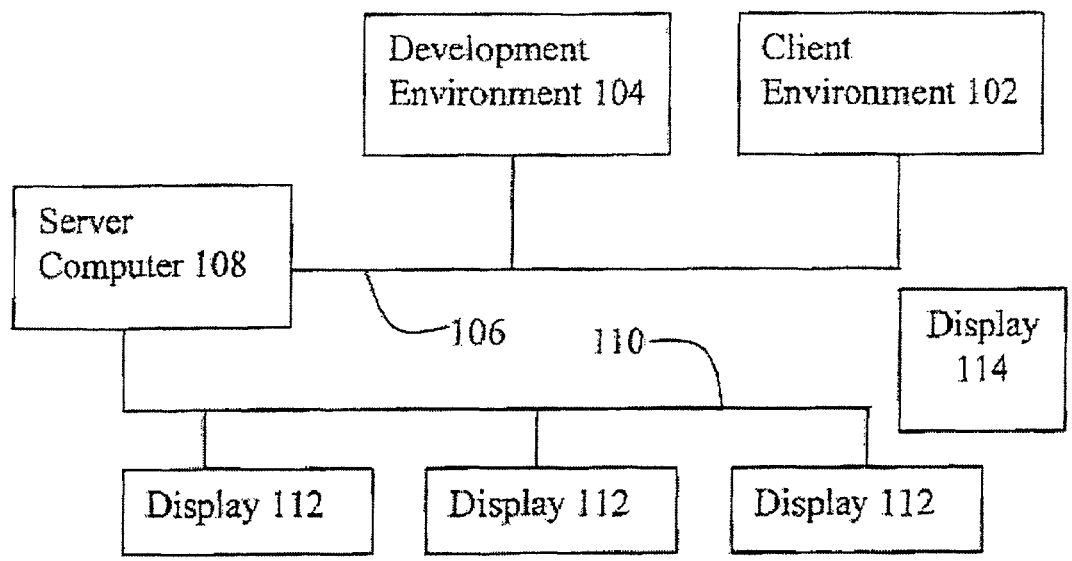
FIG. 1 illustrates one embodiment of an aerial display system in accordance with the present invention.

Referring now to FIG. 1, a block diagram of an aerial display system of the present invention is illustrated. A client environment 102 represents an advertiser or business entity that wishes to convey information or entertainment using aerial projection of video images. In one embodiment, the client environment 102 comprises a computer-based development system where sequences of video images are generated for display. The video images are typically animations because it is easier to manipulate the image although three-dimensional images generated by various camera technologies may be readily adapted for display. The video images may be displayed in conjunction with a sound track so the client environment 102 may include a sub-system for sound recording and digitization (not shown).

When finalized, the video images are transferred from the client environment 102 to a development environment 104 to ensure compliance with display rules. Accordingly, the movement of the video animation is compared to the rules to verify that the displayed image will appear as a three dimensional aerial image. A communication network 106 is used to transfer video images from the client environment 102 to the development environment 104. Network 106 may be the Internet, the telephone or wireless networks or other a local area network (LAN) such are well known in the art of computer networking.

When the video images are certified, they are transferred to a server computer 108. The server computer 108 comprises image storage and means for driving one or more display systems 112 over a network 110. The network 110 may be an Ethernet or Internet Protocol (IP) LAN or an Internet network. The networks 110 and 106 may be considered a single IP based network such as the world wide web (WWW).

As illustrated in FIG. 1, three of such display systems 112 are shown but it is to be understood that the actual number will depend on the capability of the server computer 108 to manage multiple streams of video data. Accordingly, the server computer 108 may be coupled to a single display system 112 or to a plurality of display systems greater than illustrated.

One advantage of the server arises from the advantage of tracking the response of observers to a particular sequence of animated images. Accordingly, a mouse or motion detector (not shown) may be positioned proximate to the aerial image to detect feedback from the observer. When the observer responds, this information is transmitted back to the server for statistical analysis or response. In response to the observer's input, the animated sequence may be altered by selecting one of a plurality of animation sequences either at the server or at the display level.

The sever computer 108 may store the video images in compressed format in which case either the server computer 108 or a computer system associated with each display 112 must decompress the video streams prior to display. An additional display system 114 functions in a stand-alone manner and may receive the video images from either the development environment 104 or from the server computer 108 over a temporary connection to the network 106. Alternatively, the display system 114 may be loaded with a dedicated sequence of video images and operates without connection to either the network 106 or the network 110. Video images may be transferred to additional display system 114 on a storage device such as a DVD or a CD optical disk.

Figure 2:
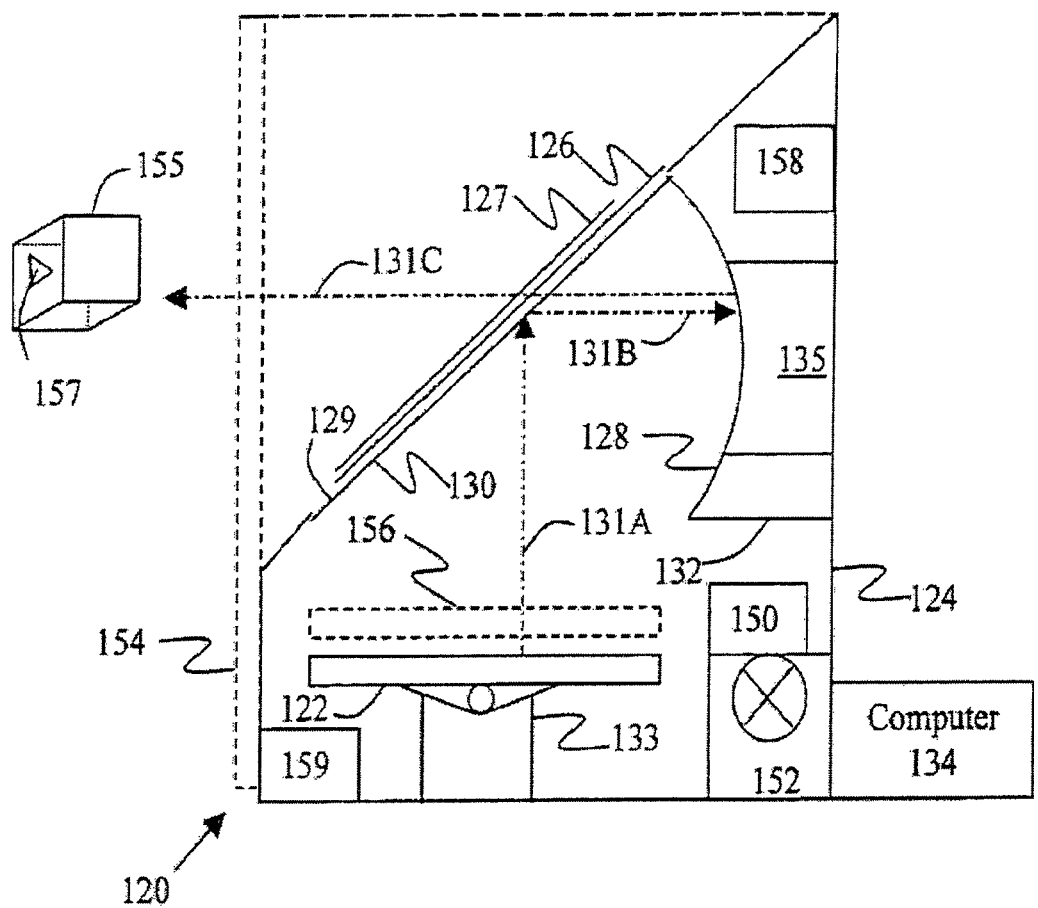
FIG. 2 illustrates a sectional side view of an aerial display system with a video display device and optical elements positioned in the aerial display system of FIG. 1.

FIG. 2 illustrates a sectional side view of an aerial display system 120 that may be used as either the display system 112 or the stand-alone display system 114. Regardless of the environmental configuration, the display system 120 incorporates a high-bright liquid crystal display (HLCD) device 122 positioned in a housing 124. The housing 124 provides the support frame for maintaining optical elements in a fixed orientation relative to the HLCD device 122. The optical elements comprise a polarizer 126, a plastic spherical mirror 128, and a beam splitter 130 positioned between the plastic spherical mirror 128 and the polarizer 126. The polarizer 126, the plastic spherical mirror 128, and the beam splitter 130 are preferably optically aligned in a first portion of the housing 124 so that the image formed on the HLCD device 122 is projected outward toward an observer as indicated by dashed arrows 131A, 131B and 131C. As illustrated, a floating 3-D image 155 is formed at a point in front of the display device. A 2-D image 157 can be overlayed on the 3-D image to give the viewer the optical appearance of a floating 3-D image.

The polarizer 126 minimizes reflections and glare that may be visible to the observer. The polarizer 126 may be either a linear polarizer or a circular polarizer with the circular polarizer preferred. In alternative embodiments, an antireflective film (not shown) is applied to the surface of the beam splitter 130 viewable by the observer and the polarizer 126 is eliminated. The antireflective film may be combined with the polarizer 126 in other embodiments. In yet another embodiment, the antireflective film is replaced by a ¼ wave retarder, which is combined with the polarizer 126. An element 127 illustrates the positional relationship between the polarizer 125 and either the antireflective film or the retarder. The polarizer 126, the mirror 128, the beam splitter 130, and optionally either the antireflective film or the ¼ wave retarder, are preferably optically aligned in a first portion of the housing 124 so that the image formed on the LCD device 122 is projected outward toward an observer.

In one preferred embodiment, the polarizer 126 is a film polarizer applied directly to the surface of the beam splitter 130 that is oriented toward the observer. Thus, the weight associated with the glass substrate of prior art polarizers is eliminated resulting in lower weight of the system 120 and minimizing the number of discrete components of the system 120. Advantageously, eliminating a discrete polarizer, such as is commonly found in prior art aerial projection display devices, significantly reduces the costs of manufacturing and maintaining system 120. For example, a 16×25 inch glass polarizer can cost as much as $850 while a film polarizer applied to the beam splitter can cost about $30. Further, when the system is disassembled for shipment, there are fewer components and less weight thereby reducing shipping and storage costs.

Spherical mirrors are well known in the art and typically comprise a glass substrate having a concave surface with evaporated aluminum applied as the reflective surface. Glass substrates are typically preferred in the prior art for use in aerial display systems because of a belief that sphericity tolerance, also known as sufficent sphericity, must be maintained to at least ±0.05% from one edge to the other to minimize distortion and to ensure realistic reproduction of the object. Unfortunately, such mirrors are heavy and expensive and have limited commercial applications.

Accordingly, in accordance with the present invention, it is preferred that the mirror be both lightweight and inexpensive. For this reason a plastic spherical mirror is preferred. With the lightweight plastic spherical mirror, coupling the mirror to housing 124 is simplified. In one embodiment, a shelf 132 is used to support the mirror along its bottom edge while a mounting bracket 135 maintains the mirror at the proper orientation with respect to the beam splitter. A 10×15 inch plastic spherical mirror with an 18-inch spherical radius is adequate for a wide variety of applications. Such applications include retail applications for the display of product advertisements, business applications for videoconferencing or sales presentations or home applications replacing a standard computer display or a television set.

In the embodiment of the present invention, plastic injection molding is used for manufacturing the plastic part 20 for a plastic spherical mirror 10 of low-cost. In the embodiment of the present invention, the injection molding method is able to yield a dimensional tolerance to as tight as ±0.0001 inch. Although the tooling for the injection molding method is relatively expensive, the cost per each plastic part 20 manufactured is however very low. A plurality of complex geometries are reproducible using injection molding according to the embodiment of the present invention and may be limited only by the manufacturability of a metal mold.

In the embodiment of the present invention, a metal mold's final finish may be formed by means of machining and polishing or other similar methods of finishing capable of producing a plastic part 20 with sufficient finish quality. The final finish may be at a A1 grade or a grade that is considered the finest finish available or a so-called "excellent" finish.

In the embodiment of the present invention, using injection molding, parts up to about 36 inches in length may be produced. The procedures used in injection molding of plastic parts are well known in the art; therefore, no details shall be discussed herein.

In the embodiment, a metal mold for injection molding is able to hold a plus or minus 0.030 inch tolerance for a general envelope dimension for a mirror (not the mirror surface 40). The spherical radius tolerance of the plastic spherical mirror 10 is able to be held to plus or minus 0.05%. The aforementioned tolerances are comparable to the glass spherical mirrors. The metal mold is able to hold up to a ±0.0001 inch tolerance.

In the embodiment of the present invention, a plurality of plastic material formulations 50 may each be used for the material for the plastic spherical mirror 10 in which a plurality of performance criteria including the following may be satisfied: material strength, thermal stability, water absorption, mold shrinkage, material flow into the mold, UL recognition, manufacturing considerations, surface density, lubricant content, and scratch resistance.

In the embodiment of the present invention, the plastic material formulation 50 may comprise of one of the following: optical-grade polycarbonate, natural-grade polycarbonate, UV-grade polycarbonate, polyetherimide, glass-filled grade polyetherimide, PMMA (acrylic), and other comparable plastic materials of having similar performance criteria. The selection of the plastic material formulation 50 may be based on the degree of precision for the mold tooling as well as experimental results from part testing.

Figure 7:
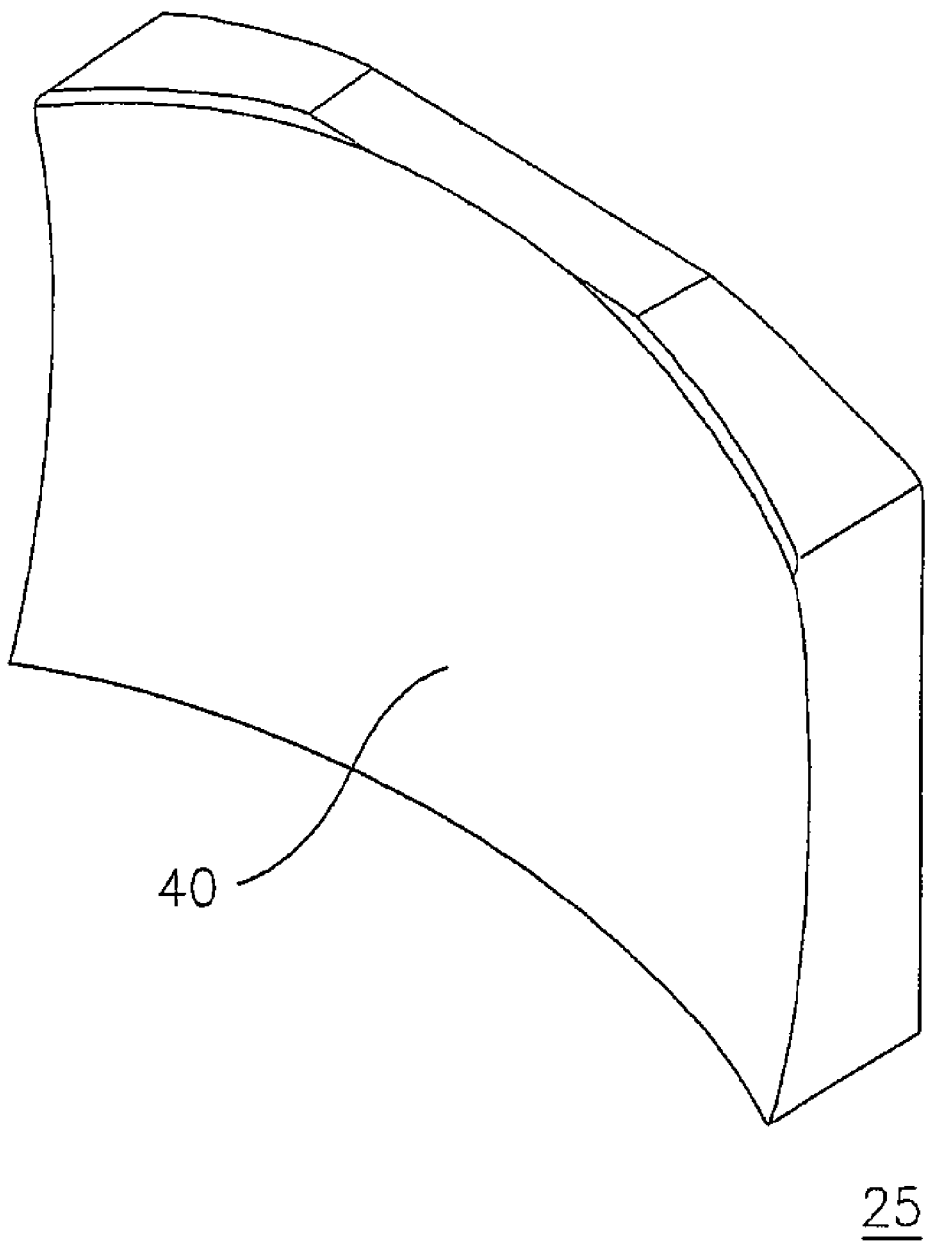
FIG. 7 illustrates an embodiment of a trimmed plastic part for the plastic spherical mirror in accordance with the present invention.

In the embodiment of the present invention, vacuum metallization or vacuum deposition may be used, in a metalizing phase, for coating the mirror surface 40 of the trimmed plastic part 25 as illustrated in FIG. 7 or the plastic spherical mirror 10 with an evaporated metal vapor. The metal deposited on the plastic surface is preferably to be at a thickness of about four to eight microns. The metalizing phase is followed by a spraying of a protective overcoat onto a metalized mirror surface 45. The metalized plastic part 30 that has been vacuum metalized may possess improved quality because of improved quality control of the surface of the plastic material that is being coated by means of the minimizing of the amount of flaws that are on the plastic surface resulting from the molding process. Furthermore, the metallization is to have excellent adhesion with respect to the mirror surface 40 of the underlying plastic part 20.

Figure 6:
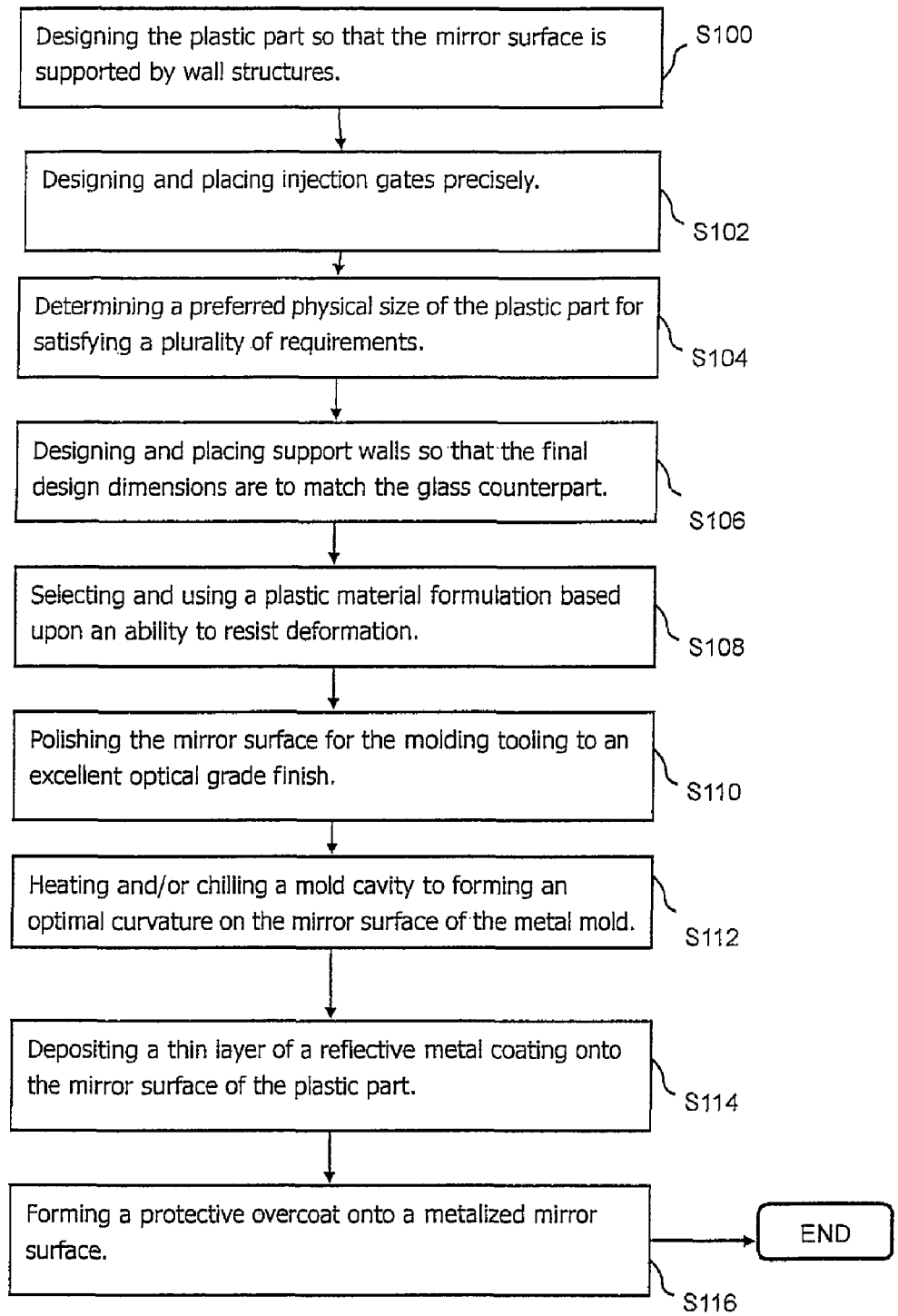
FIG. 6 illustrates an embodiment of a method in accordance with the present invention for fabricating a plastic spherical mirror.

Referring to FIG. 6, in the embodiment of the present invention, a method for producing the plastic spherical mirror 10, in which the plastic part 20 of relative thin thickness is to hold its form after it is heated and cooled, may include a plurality of the following steps:

Part Design a) Designing the plastic part so that the mirror surface is supported for preventing of distortion or twisting by designing a plurality of wall structures onto the entire edge of a mirror edge (S200);

b) Designing and placing a plurality of injection gates precisely with the intent of ensuring the elimination of remnants or knit lines created by plastic resin flow (S202);

c) Determining a preferred physical size of the plastic part for satisfying a plurality of optical performance requirements and physical design requirements (S204);

d) Designing and placing a plurality of support walls in the plastic part so that the final design dimensions of the plastic part are to match that of the glass counterpart (S206);

Material Selection a) Selecting and using a plastic material formulation based upon an ability to resist deformation according to a plastic part quality specification (S208);

Mold Tooling Processing a) Polishing the mirror surface for the metal mold to an excellent optical grade finish (S210);

b) Heating and/or chilling a metal mold to form an optimal curvature on the mirror surface of the metal mold (S212);

Mirror Formation a) Depositing a thin layer of a reflective metal coating onto the mirror surface of the plastic part (S214);

b) Forming a protective overcoat onto a metalized mirror surface (S216);

Referring to FIG. 7, an embodiment of a trimmed plastic part 25 which has been trimmed for use for a plastic spherical mirror 10 in accordance with the present invention is illustrated.

Figure 8:
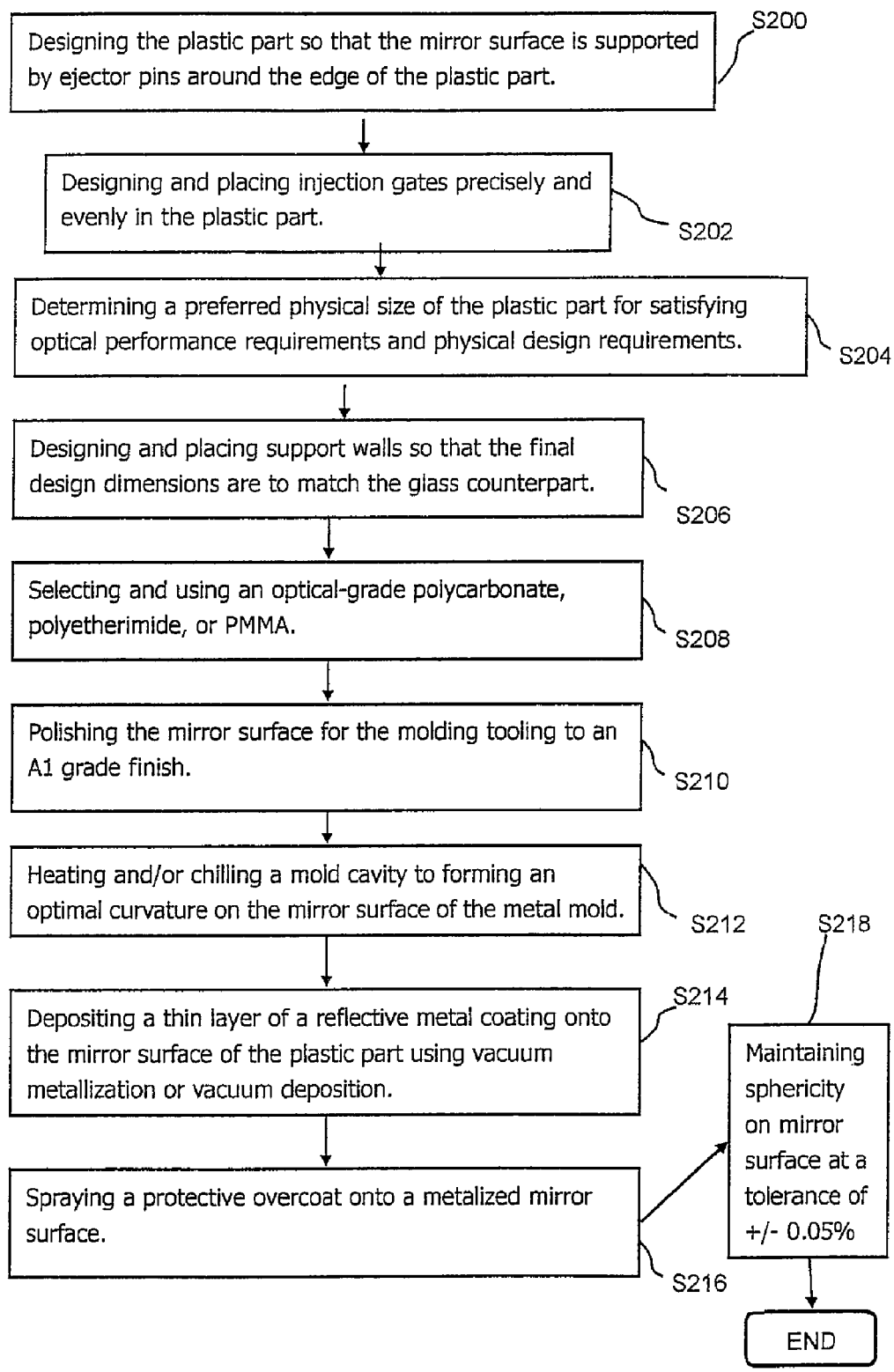
FIG. 8 illustrates another embodiment of a method in accordance with the present invention for fabricating a plastic spherical mirror.

Referring to FIG. 8, in another embodiment of the present invention, a method for producing the plastic spherical mirror 10, in which the plastic part 20 of relative thin thickness is to hold its form after it is heated and cooled, may include a plurality of the following steps:

Part Design a) Designing the plastic part so that the mirror surface is supported for preventing of distortion or twisting by designing a plurality of ejector pins, such as 28 ejector pins, around the edge of the plastic part serving to allow for part removal from the metal mold without distorting the surface geometry or damaging the mirror surface finish (S300);

b) Designing a plurality of plastic injection gates and placing the plastic injection gates precisely and evenly in the plastic part (S302);

c) Determining a preferred physical size of the plastic part for satisfying a plurality of optical performance requirements and physical design requirements (S304);

d) Designing and placing a plurality of support walls strategically in the plastic part (S306).

Material Selection a) Selecting and using an optical-grade polycarbonate, polyetherimide, or PMMA (acrylic) as the plastic material formulation for use as the plastic spherical mirror (S308);

Mold Tooling Processing a) Polishing the mirror surface for the metal mold using high grade steel to an A1 finish (S310);

b) Heating and/or chilling a mold cavity to forming an optimal curvature on the mirror surface of the metal mold (S312);

Mirror Formation a) Depositing a thin layer of a reflective metal coating onto the mirror surface of the plastic part using vacuum metallization or vacuum deposition at preferably a thickness of four to eight microns (S314);

b) Spraying a protective overcoat onto a metalized mirror surface (S316);

Finished Part Inspection a) Maintaining sphericity on the mirror surface of the plastic spherical mirror at a tolerance of ±0.05% (S318) (also known as obtaining a sufficient sphericity).

Figure 9:
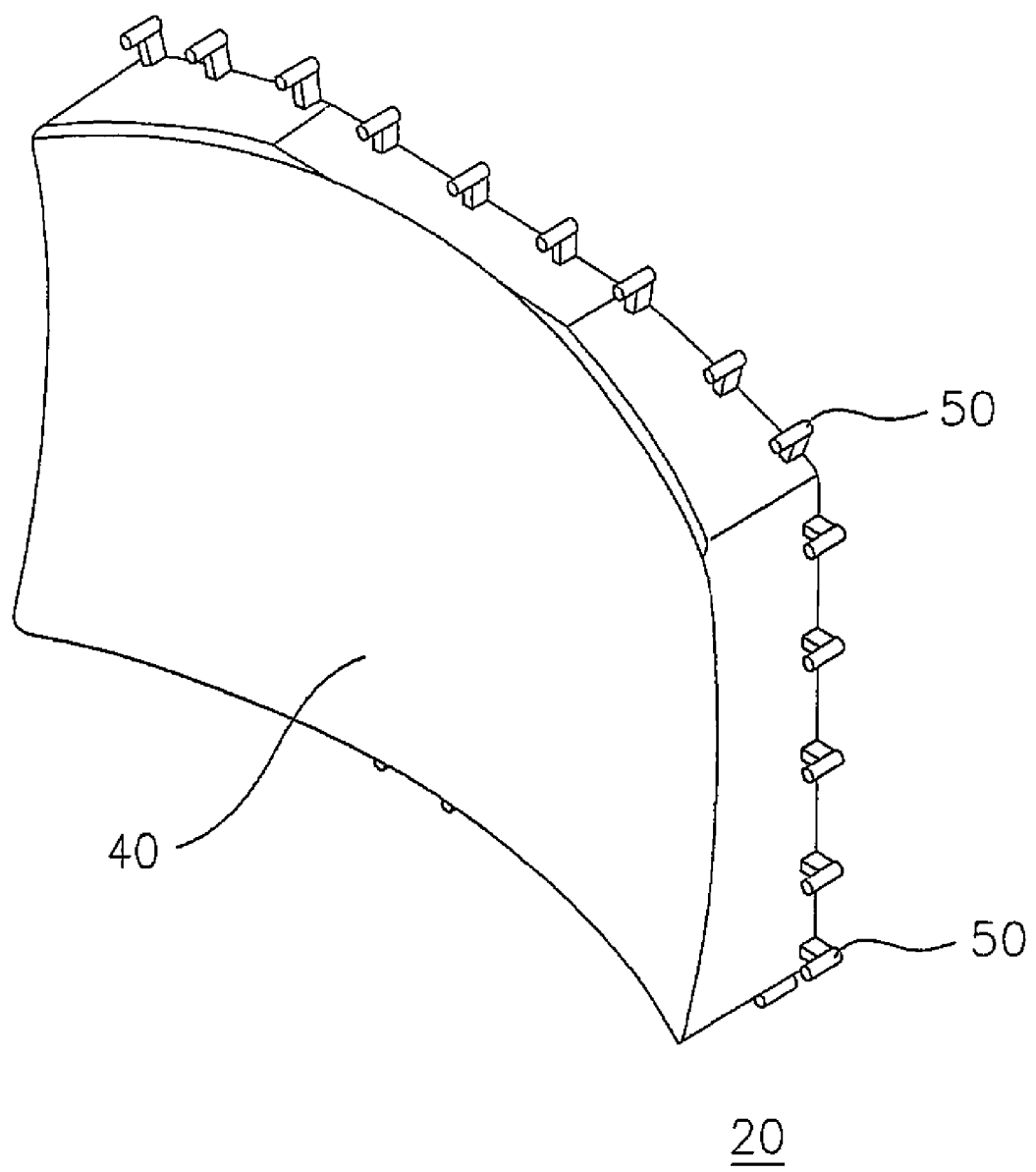
FIG. 9 illustrates another embodiment of a plastic part after injection molding in accordance with the present invention.

Referring to FIG. 9, a plastic part 20 after injection molding in accordance with another embodiment of the present invention is illustrated. The ejector pins 50 are disposed around the edge of the plastic part serving to allow for part removal from the metal mold without distorting the surface geometry or damaging the mirror surface 40.

Beam splitters are also well known in the art and typically comprise a partially silvered glass plate. As noted above, glass is both heavy and expensive. Accordingly, beam splitter 130 preferably comprises a partially silvered plastic plate and, more specifically, a sheet of partially silvered acrylic plastic or plexiglass, both of which are lightweight and inexpensive with optical qualities comparable to glass. The beam splitter should be larger than the mirror. In one embodiment, the beam splitter is approximately 12×16 inches.

In a second portion of housing 124, HLCD device 122 is oriented so that displayed images are projected toward beam splitter 130. An HLCD mounting bracket 133 is used to orient the display. Although not critical to the present invention, it is preferred that bracket 133 attach to HLCD device 122 in a manner that enables the HLCD device 122 to be pivoted toward the rear of enclosure 124 for easy cleaning. Further, the mounting bracket should be vertically adjustable so that the position of the display may be adjusted relative to the beam splitter. A computer 134 is shown outside of housing 124; however, it should be understood that computer 134 could be positioned proximate to mounting bracket 133 inside housing 124. Computer 134 controls the display driver in response to selection of one or more animation image files transferred to the computer from either the server or from a CD-ROM disk. In an alternative embodiment, the mounting bracket is omitted and computer 134 is adapted to support and orient HLCD device 122. If system 120 is provided without a local computer, images displayed on HLCD device 122 are transferred directly from server computer 108.

To prevent reflected images from being propagated throughout the optical path, the surface of HLCD device 122 facing the beam splitter may be coated with an anti-reflective coating. Without the anti-reflective coating, the observer could, under certain viewing conditions, view their own image or a double image created by a reflection of the aerial image due to an optical mis-match between the optical elements and HLCD device 122.

Figure 3:
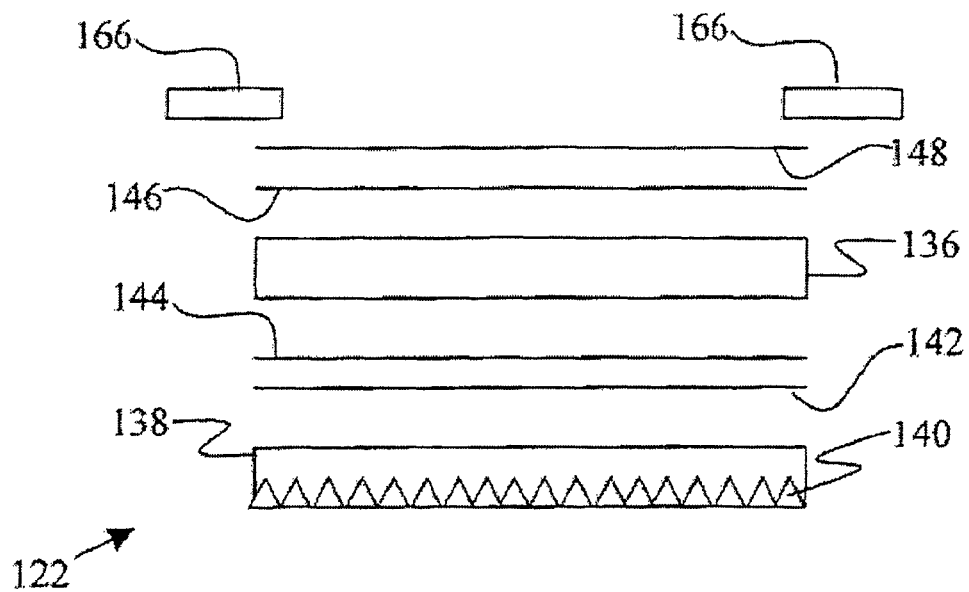
FIG. 3 illustrates an HLCD display device associated with the video display device of FIG. 2.

Referring now to FIG. 3, HLCD device 122 is illustrated in detail. In one preferred embodiment, HLCD device 122 comprises a liquid crystal display panel 136. To obtain true video display rates, panel 136 is based on TFT HLCD panel technology where the term TFT refers to thin film transistors. The transistors are controlled to transmit selective frequencies of light. Typically, three thin film transistors define a pixel, one to control the green component, one to control the red component and one to control the blue component. TFT liquid crystal display panel technology is well known in the art and will not be further explained. The panel 136 is referred to as a high bright dark field panel that incorporates a bright (high lumens or NITS) backlight but maintains a true black even at high levels of illumination. It will be appreciated that with standard commercial liquid crystal panels, a bright backlight will cause a small amount of light to pass between pixels resulting in a gray appearance rather than a true black. Thus, with prior art TFT HLCD panels, high intensity light tends to 'wash-out' black and other dark colors resulting in the display of a black-gray color that an observer may readily detect. More specifically, with the gray color, the edges of the panel 136 are readily discernable to an observer of the aerial image. Accordingly, the panel 136 is a dark field panel. The phrase 'dark field' means that the panel 136 further includes low transmissivity between pixels. Low transmissivity means that uncontrollable transmission of light is effectively eliminated from the regions of the panel between adjacent pixels. A black out grid, printed around the pixels, is an example of a mechanical means for limiting light transmission from the region between the pixels.

To obtain the brightness required for projecting vivid aerial images, a full spectrum backlight 138 is used as a light source for illuminating the screen. The back light intensity is increased from a typical 250 NITS to at least 1500 NITS. A prism 140 reflects off-axis light back through panel 136. A plurality of Birefringence filters 142 and 144 remove high frequency components and orient the light before it reaches the panel 136. A primary consideration when displaying video images is that the backlight retains sufficient intensity to project an aerial image even as the backlight efficiency decreases over time. Accordingly, the intensity of backlight is initially set to a level less than maximum. For example, the brightness is set to between 50% and 80% of maximum intensity and preferably to about 75%. Over time, as the efficiency of the backlight degrades, the intensity may be increased to compensate for degradation.

As is well understood in the art of computers, by controlling the state of the pixels on the panel 136, selective frequencies of light are passed to form an image on the screen. Thereafter, the light passes through a light collimating filter 146 and a polarizer 148, which may be a linear polarizer. The polarizer 148 includes a layer of anti-reflective coating on the surface oriented away from the panel 136. The coating minimizes reflected light that could be retransmitted through the optical elements and is an especially important feature if the polarizer 126 is eliminated.

It will be appreciated that common video monitors configured for use in ambient light conditions have insufficient brightness to achieve a vivid aerial image of the displayed video images. Simply increasing the brightness is an unacceptable alternative because the raster scan becomes visible thereby rendering illusion of an aerial image ineffective. Plasma display panels, while bright, are too expensive for most commercial applications. Field emissive displays (FEDS) are also too expensive and are not sufficiently bright enough. Further, commercial LCD devices typically provide a wide field of view. However, in accordance with the present invention, the HLCD device 122 preferably has a narrow field of view to reduce disbursement of off-axis light and focus a high percentage of light in the forward direction toward the observer. Accordingly, the HLCD device 122 is the preferred platform for generating a bright image on a black background. The aerial projection system in accordance with the present invention projects a vivid video image where the observer cannot perceive the outline of panel 136 even with the increase in brightness of the backlight 138. In accordance with the present invention, the aerial image is further improved by use of the dark-field panel 136 in combination with optical filters, polarizers and anti-reflective coatings.

Referring again to FIG. 2, the housing 124 includes a thermal control switch 150 to maintain operating ambient temperatures inside the housing 124 below at least 100.degree. F. and preferably to about 85.degree. F. To achieve this environment, a plurality of fans 152 are coupled to the control switch 150. The fans create air movement in the second portion of the housing 124 and particularly around the HLCD device 122 to minimize ambient heating associated with the backlight 138.

Figure 4:
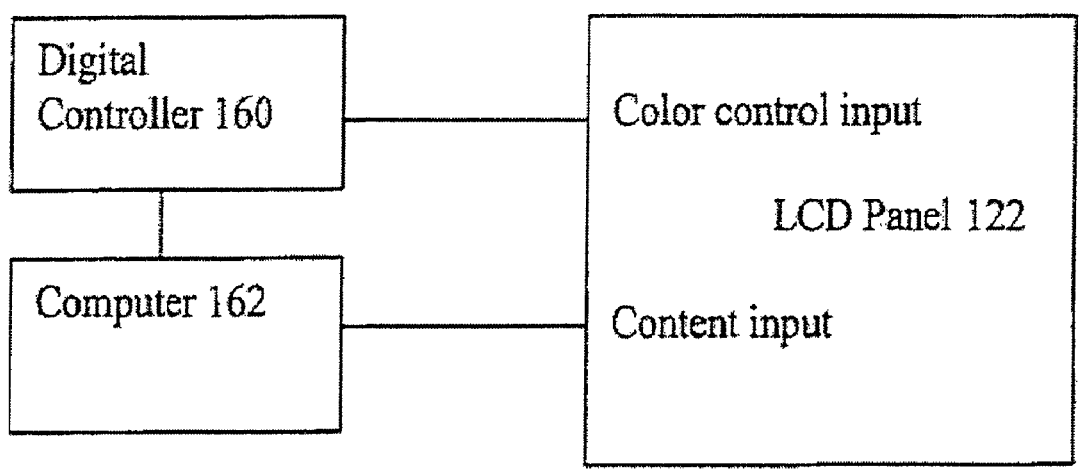
FIG. 4 is a block diagram showing the interface of a digital controller and associated HLCD display device illustrated in FIG. 3.

Referring to FIG. 4, a digital controller 160 associated with the HLCD device 122 is illustrated. In the preferred embodiment, the controller 160 interfaces with either the server computer 108 or the computer 134 to receive display information. Using display information, the digital controller 160 controls the pixels of the panel 136. Pixels that are not a part of the displayed image (that is inactive pixels) are set to super-black. The digital controller 160 is responsible for ensuring that inactive pixels are not partially transmissive by providing a digital signal corresponding to super-black. Super-black, by way of example, is defined as follows: where there are 256 shades of gray between black and white, super-black comprises the darkest twenty shades (approximately the darkest 8%) and preferably the darkest five shades (approximately 2%). The digital controller 160 is adjusted so that the lowest output level (zero red, zero green and zero blue) corresponds to the darkest achievable state. The digital controller 160 interfaces with a dedicated microprocessor 162 that drives the HLCD device 122. To achieve true black pixels, the digital controller 160 must control the gray scale such that the minimum output of the controller corresponds to the darkest state of the HLCD.

Figure 5:
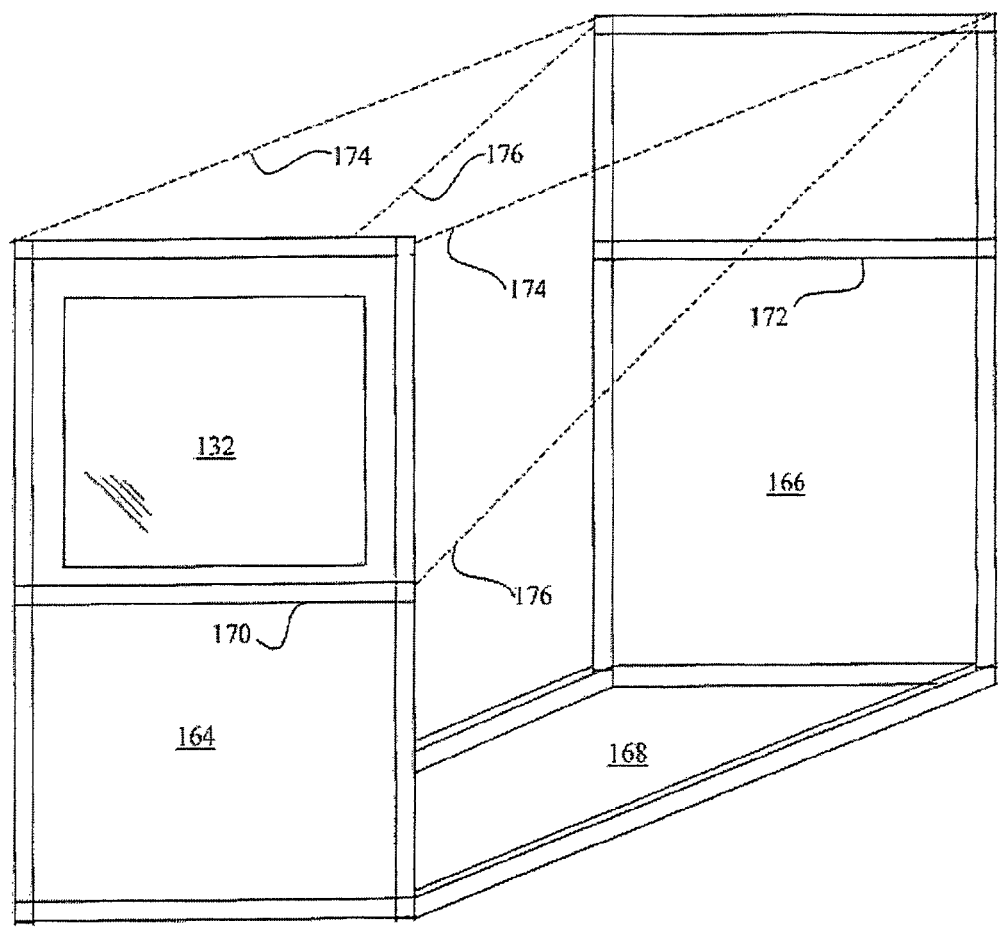
FIG. 5 illustrates a lightweight modular housing structure for the aerial display system in accordance with the present invention.

FIG. 5 illustrates an alternative lightweight modular structure for the housing 124. In one preferred embodiment, the housing 124 comprises a lightweight aluminum frame having a front panel 164, a back panel 166 and a base panel 168. The frame may be hinged so that the front and rear panels fold down onto the base panel to minimize the space needed to transport or store the housing 124. Alternatively, the frame may comprise a front, rear and a base portion that employ a peg and socket technique to maintain the panels in the proper orientation. Thus, when traveling, the panels are separated and stacked so that it may be readily boxed or carried.

The front and rear panels 164 and 166 each comprise a sheet of lightweight opaque plastic. Preferably, the plastic is black. The exterior side of the plastic sheets may include printed graphics or ornamental designs attached to one or more panels. Thus, the housing 124 may be quickly adapted to match the intended use of the display system. For example, the exterior may be printed with a company's logo to draw the attention of observer in the vicinity to view the animation or a company's icon may be attached to the housing.

The panels 164, 166 and 168 define generally rectangular walls although other shapes may be readily envisioned. The cross-members 170 and 172 provide rigidity to the housing and are used for mounting the optical elements illustrated in FIG. 2. Rods or other rigid members, represented by the dashed lines 174 are used to couple the top of the front panel 164 to the back panel 166. Diagonal support rods, illustrated by the dashed lines 176, are used to support and position the beam splitter optical element in front of the mirror 128. The rods 176 extend from the cross-member 170 to the top of the back panel 166. The manner of connecting rods 176 to the cross member 170 and the back panel 166 is not critical so long as the connection is stable and able to support the weight of the beam splitter.

A top panel, which may be a rigid plastic sheet (not shown) is positioned over of the rods 174 and secured to top of the front and back panels 164 and 166, respectively. Side panels (not shown), which again may be rigid plastic sheets, are secured to the base 168 and the front and back panels 164 and 166, respectively. These panels may fit into a groove provided on the inside portion of the base panel 168, the front panel 164, and the back panel 166 so as to provide a aesthetically pleasing "tongue and groove" appearance. The tongue and groove method for attaching the panels to the frame ensures a dark interior by eliminating any gaps through which ambient light may pass. Further, the tongue and groove eliminates the need to transport or store a separate mechanism, such as screws or tape, for attaching the facade to the frame. An interior blackout curtain (not shown) or other optical block may be positioned along the joints between panels to minimize entry of ambient light.

In contrast to the pedestal housing shown in FIG. 2 where the beam splitter form the front and top of the housing, the embodiment shown in FIG. 4 fully encloses the mirror and beam splitter within the housing. The selection of the housing design may vary depending on the specific application and is typically an engineering or marketing selection.

The housing 124 is lightweight and is capable of being readily transported or stored. Because the housing 124 is also inexpensive, multiple housings may be used in an interchangeable manner while sharing the optical elements. Thus, it is possible to rapidly change the exterior appearance of the housing to fit the intended application or to transfer the optical elements to another housing so that the user need not wait to change from one task to another.

Referring again to FIG. 2, housing 124 may include an optional transparent imaging panel 154 that attaches to the top of front panel 164. The Panel 154 is independently controlled to generate a displayed image that is separate from the aerial image. Importantly, because the panel 154 is normally transparent, the display of the aerial image is not affected. However, the panel 154 may be controlled to act as a light curtain, or a light valve. When the aerial image is projected, the panel 154 is changed to transparent so that the aerial image is observable. Importantly, portions of the panel 154 may be selectively controlled to provide a full color background for the aerial image. One preferred panel 154 is commercially available from ProVision Entertainment, the assignee of the present invention, under the trademark of T.I.M.™.

Another optional display panel 156 may be positioned in the interior of the housing 124 proximate to the video display device 122. As with the panel 154, the panel 156 is independently controllable. However, unlike the panel 154, the image formed on the panel 156 is projected as an aerial image in combination with the image formed on the panel 122. It is preferred that the panel 156 have a larger than the display area of panel 122 so that it is not visible in the transparent mode. Further, it is preferred that the panel 156 be normally clear transparent so that it is not necessary to maintain the panel 156 with a superblack background. The panel 156 is useful as a light curtain or for displaying special effects, such as showing linear motion of the aerial image toward the observer. Advantageously, the panels 154 and 156 generate full color images at video rates.

In order to generate images (video content) for display, a software application product provided by Provision Entertainment, the assignee of the present application, converts digitized images to a display format compatible with the aerial projection system 100. The digitized images must be consistent with a set of display rules to ensure the image appears as a three-dimensional image. By way of example, the video content is not allowed to move off the edge of the display device because the content must always remain on the screen to avoid having the observer detect the edge of the screen. Additional rules include: 1) converting the background a super-black state to achieve high contrast with the floating image; 2) using effective color schemes that incorporate red and yellow colors and de-emphasize blue and green colors which do not project well; and 3) removing images from the video content if they do not project well. The surface appearance of an object is important to provide and maintain the illusion of a three-dimensional image. Selecting the proper color scheme will sharpen the "3-D" effect and give the observer the sense of depth and volume.

In one preferred embodiment, popular digital image tools are used to create displayable images that are then placed in a computer file associated with the computer 162. When the file is to be displayed, the computer 162 controls the digital controller 160 and the HLCD device 122 to generate a floating image. The computer 162 plays the video content as a series of still images to achieve the appearance of motion. The controller 160 utilizes a commercially available DIVx MPEG-4 Video Codec to support a minimum screen resolution of 800×600 pixels, ten (10) frames per second, a ninety (90) smoothness-crisp and a 6000 bits per second data transfer rate from the computer 162 to the HLCD device 122. Although, the quality of the displayed image with the 6000 bpi date transfer is satisfactory for most applications, it is possible that the play of the image sequence may be interrupted or if the computer 162 is multitasking or has a large number of applications running in the background. For animated images, it is desirable to minimize rapid or quick movement to correspond to a 3000 bpi data rate. Accordingly, the set of display rules includes the limitation to minimize image movement to a rate that is no more than one half of the maximum transfer rate.

The set of design rules further include a technique for effectively presenting an animated image to the observer. Specifically, materialization of an image from behind a foggy background is an effective manner to present an image. Materialization is also used when rapid shape variation of an image occurs during a rotational motion. When a picture is not stable but rather dithered at a slow rate, the holographic effect is further enhanced. Images are removed from view by dissolving the image in the conjunction with generation of a strobe light image.

Display of a human face, head or full body of a model in real-time is possible by positioning the model in front of a dark, preferably black background. Multiple cameras are positioned around the subject to obtain multiple perspective views for creating the illusion of a three-dimensional person. As used herein, the work "model" refers to a human or an animal by way of example.

Regardless of the source, the animation sequence is stored as an AVI file and then selected for play by selecting the desired file from a list of available files. In one preferred embodiment, a media player available from Provision Interactive Technologies, Inc., the assignee of the present invention, is used to present the file to the observer. The media player maps the image onto the full screen without any border or framing to maintain the illusion of three-dimensional image floating in space. To minimize the time necessary to select and begin execution of a file, a play list defining the sequence order of play of a plurality of animation sequences is maintained as a .TXT file with the individual AVI files stored as executable files.

Although the projected image is of good quality, it is effective only if it is simple and more geometric in nature because of visual limitations of most observers. It has been found that very fine nuances, such as subtle blur, color change and subtle movements, in the projected image are not readily detectable. Accordingly, it is necessary to increase the emphasis on such nuances when it is desirable to draw the observer's attention to a selected nuance.

Ideally, the projected image is of a large object, which means that it incorporates a substantial portion of the display panel. It has been observed that large form images are more readily detected than small forms because the objects appear to become visually undetectable to the observer against the dark background. Because the mirror projects the picture in a proportion of at least 1:1, the projected image preferably comprises about a third of the viewable number of pixels of a display with a minimum resolution of 800×600. Thus, in one embodiment, the minimum size of a typical object is approximately 448×338 of the pixels in the center of the HLCD panel to ensure that the observer can detect subtle details. For larger displays, the number of pixels in the display may increase but the number of pixels comprising the image need not do so in like proportion. Further, the number of pixels comprising the projected image may not be centered when larger displays are used. Further still, adjusting the optical elements to magnify the image formed on the HLCD panel may decrease the number of pixels comprising the image.

As noted above, the background color of display screen must be dark with no red, green or blue component, that is, 0.0.0 (rgb). The switching speed is an engineering selection but the HLCD must maintain the background as a black or dark color. Every image must "appear" out this dark background to maintain the aerial illusion. However, the image must be bright and the colors must be saturated to maintain an observable bright line between the image and the background. It has been observed that warm colors, such as red and orange, are bright, saturated and vivid in space. In contrast, the color blue appears to fade into the background and is not an effective color because the visual perception is minimized. Instead of blue, bluish green, neon green, and yellow colors are more effective and vivid. In general, regardless of the displayed color, a shiny metallic or reflective appearance regardless of the color is more effective than dull images in the same colors. Further, over-lighting an image, such as if a bright spotlight were shining on it, is effective to enhance visual perception and attract the observer's attention.

Another problem associated with projecting a three-dimensional image formed on a flat HLCD display is image distortion caused by the spherical mirror. Accordingly, it is often necessary to modify the final animation of the image to provide the necessary compensation so that the aerial image appears to be correctly proportioned. This optical compensation is added to the image in development environment 104. More specifically, when the panel 122 is positioned close, such as about eight (8) inches, to the beam splitter, the image displayed on the screen is projected further into space away from the housing 124 but the magnified image is distorted by the spherical mirror. One solution to removing this distortion would be to position the panel 122 at the correct focal point, such as, by way of example, about 25 inches from the beam splitter. However, this limits the size of the aerial image to a 1:1 magnification ratio and limits the distance the image is projected. Thus, to obtain a magnified image far out in space, the panel 122 is moved toward the beam splitter and a bell-like distortion effect is compensated for in software. The software pre-distorts the image so that when displayed, the optical distortion is exactly compensated by introducing an equal and opposite distortion so that the image appears normal to the observer. As used herein, bell-like distortion means that the center of the image is magnified more than the side edges of the image. The actual amount of pre-distortion introduced to the animated image depends on the location of the panel 122 and the specific optical characteristics of the spherical mirror.

As can be appreciated, the difficulty associated with projecting a three-dimensional aerial image places a heavy burden on the presentation of the image to the observer to maintain the illusion of depth. Accordingly, certain techniques are employed to create an interesting transition from one object to another, to add text or to otherwise add interesting background visual imagery. While certain display rules were discussed above, these rules are applicable to the displayed image. Accordingly, additional techniques, or rules, are employed to maintain the three-dimensional illusion during the transition from one to different image.

Typically, an image in the foreground is in sharp clear focus while images in the background are blurred or fuzzy. Changing the focus of an object in the background so that it is clear and sharp can be used to draw the observer's attention to the new object. In some situations, the foreground image can then be blurred so that the observer will focus on the background image. Environmental fog is effective for initially obscuring an object until the fog clears.

The aerial display of existing commercials (images captured on film) or a 3D movie is visually effective when transposed from a 2-dimensional format to a spatial form. One such spatial form comprises the use of a rotating cube 155

(FIG. 2) with the images 157 of the film images shown on the faces of the cube. More specifically, a pre-existing 2D commercial or promotional video footage may be converted to an aerial image without having to recreate a complete new animation using a flying cube as the floating object. The flying cube has six relatively large flat faces and the 2D video footage is displayed within the boundary defined by at least one of the faces. Indeed, all six faces can display the same footage or six different video sequences can be displayed simultaneously. The advantage of the floating cube is that it is easy to convert 2D video footage for 3D display.

The use of the spatial form to display 2-dimensional images can be combined with three-dimensional animation. The animations may include an animated person or, for example, a cyborg head.)

To remove a displayed aerial image and replace it with another image, a transitional sequence is preferably used. One transitional sequence comprising a particulate display is used to initially obscure the image and then to hide the image from view by the observer so that the illusion of a three-dimensional image is maintained. Fog or explosive particulate may appear in the background and grow to envelop and eventually hide the aerial image. As the fog or particulate clears, a new object may be presented to the observer.

The display of floating, three-dimensional text is very effective if the font size is sufficiently large to enable easy viewing. To preserve the appearance of a floating image, the letters must have an associated depth giving the letters a three-dimensional appearance. An effective textual display provides for the formation of words and sentences after preliminary movement in space such as if the letters were approaching the observer from the depth of space. It is also effective if letters are given a metallic shine or appearance and materialize in space one by one. Using text in conjunction with an aerial image plays an important role in presenting both visual and text based information.

Photographs and or other two-dimensional images can be projected effectively by positioning in a floating window that adds dimensional aspects to the projected image. Background music is added to the animation sequence in the development environment in a manner that is commonly used for television commercials. Musical effects are used to emphasize the three-dimensional motion and to draw the attention of observers.

With the illusion of a three dimensional aerial image that may be changed at video rates, it is also possible to combine real time video feedback with the aerial image. Specifically, an aerial display of a 3D animated image is displayed for viewing by at least one observer. A video camera 158 (FIG. 2), mounted on or located proximate to the housing 124 is coupled to the computer 134. The Video camera 158 detects the presence of the observer and combines the real-time video image with the animated image. In this manner, the observer becomes a part of the displayed image. This feature is very effective for products, such as mobile a video-phone where the observer can see how they will appear to someone having a video-phone or an automobile, where the observer can be seen seated in the driver seat.

The video feed from the camera is overlayed onto an animation layer. More specifically, the video feed is mapped onto a flat surface that is determined by four connected straight lines. More than one video feed can be mapped onto the surface so it is possible to add special effects prior to displaying the combined image. The panel 156 is particularly useful for incorporating additional special effects.

Referring to FIGS. 2 and 3, if the panel 136 has a small screen size, a realistic floating image can be produced with relatively low contrast. However, as the screen size increases, a mechanical shield 166 is preferably added to hide the edges of the screen. For example, with a 30-inch HLCD display device, the combination of a mechanical shield 166 and high contrast ratio provide an effective aerial image projection device without a visible aerial image of an outline of the screen. In one preferred embodiment, the contrast ratio is between 400:1 and 500:1. This contrast ratio compares to a typical contrast ratio in the range of 250:1 to 300:1 for commercially available HLCD display devices.

Further improvement is obtained by matching the size of the screen to the mirror and optical elements so that the edge of the screen is not projected. When displaying the image, it is necessary to position within the region aligned with the mirror. Thus, by increasing the size of the display while decreasing the radius of the mirror, the aerial projection system achieves high contrast, realistic floating images without a visible edge.

In yet another aspect of the present invention, a 360.degree. image of an object is generated against a blue screen. This image is then digitally edited to include background scenery or special effects to produce video content. Thus, a person may be digitized and then inserted into a three-dimensional animated sequence and projected as a composite three-dimensional aerial image.

A communication port 159 is also associated with the housing 124 and coupled to the computer 134. The communication port 159 includes an infrared (IR) data port that enables the observer to interact in response to the displayed aerial image. By way of example, the observer may use a commercially available personal digital assistant (PDA) equipped with an IR port to download information regarding the aerial display. The IR port may also be used to manipulate the image and to gather information responsive to a specific request for information from the observer. Data transfer using IR ports is well known.

The communication port 159 also includes a speech recognition module. A preferred speech recognition module is the Philips Speech Processing product available from Speech.Philips.com. Thus, the observer may manipulate the aerial image using voice commands. By way of example, if the aerial image is an automobile, the observer may request that the passenger's door be opened and that the image be rotated to the right by forty degrees. The observer could then request to see the automobile in a different color. In this manner, the observer is readily able to manipulate the aerial image in an interactive manner and to obtain information responsive to their individual needs.

Figure 10:
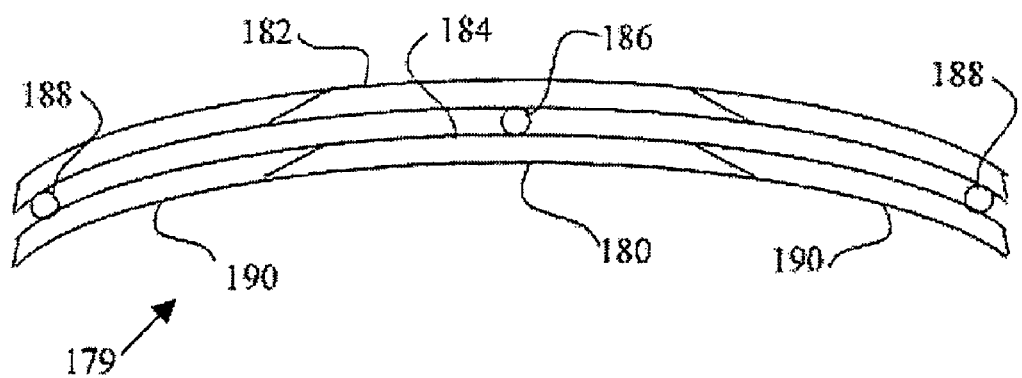
FIG. 10 illustrates a top view of a composite plastic spherical mirror in accordance with the present invention.

Referring now to FIG. 10, a-top view of a composite plastic mirror 179 is illustrated. With a plastic mirror, costs and weight are significantly reduced. However, to overcome the limitations of plastic, the mirror 179 must reflect the image without ripple or visible optical defects. Indeed, it is commonly accepted that plastic mirrors are insufficient to produce realistic aerial images. However, the mirror 179 achieves the necessary optical qualities and minimizes warping by maintaining a sphericity tolerance of ±0.0.5% from one edge of the mirror to the other, known also as obtaining a sufficient sphericity. This tolerance compares to a sphericity tolerance of ±0.05% for glass substrate mirrors that is typically required for creating an aerial image of static objects.

In one preferred embodiment, a sheet of mirror grade acrylic plastic, without visibly detectable chatter, is heated and placed over a mold having a spherical radius of 18.00 inches for one embodiment to form the desired concave mirror surface. It will be apparent that a larger or smaller spherical radius may be selected depending upon the specific application. The sheet may also be heated and blow molded into a mold. Alternatively still, the acrylic mirror may be injection molded to achieve the desired dimension but injection molds are expensive and are most suitable for high volume applications. As used herein, chatter refers to an artifact of extrusion of a sheet of acrylic plastic and is the cause of optical distortion. Thus, the extrusion process must be closely controlled to minimize introducing chatter into the sheet because it is critical to begin the molding process with optical quality acrylic. Minimizing surface defects caused by dust or other debris is also critical for minimizing optical distortion. Accordingly, the molding process is preferably conducted in a clean room environment and both the sheet of acrylic and the mold are cleaned before the molding occurs.

After cleaning, the mold is coated with a release agent and the acrylic sheet is then molded and coated with a removable protective covering. Once molded, both surfaces are further treated to minimize surface defects. The mirror 179 must have a surface quality of 80–50 scratch/dig where scratch/dig is a common measure of surface defects.

The mirror 179 is a composite mirror comprising a front substrate 180 and a rear substrate 182. Both substrates are preferably a quarter inch thick sheet of acrylic plastic cut to the necessary dimensions. The backside 184 of the substrate 180 is coated with aluminum. The coating may be applied using a vacuum deposition process to provide a mirror-like finish.

The substrate 182 need not include the coating of aluminum as its purpose is to provide structural support for the substrate 180 and to minimize warping due to the different thermal coefficient of expansion of acrylic and aluminum. The substrate 182 is laminated to the substrate 180 after it is aluminized. To minimize stress, epoxy or other bonding agents is applied to selected areas of the surface 184. By way of example, the epoxy regions 188 are each proximate to a corner of the substrates. The epoxy region 186 is proximate to the center of the substrates. It will be appreciated that additional epoxy regions may be required for large dimensional mirrors. The epoxy should have low thermal conductivity to insulate the sheet 182 from the sheet 180. The preferred epoxy is RTV-108 silicon adhesive although other adhesives, such as Bondo, may be used. A suitable mounting bracket (not shown) may be attached to the back of the sheet 182 for attachment to the housing 124.

Figure 11:
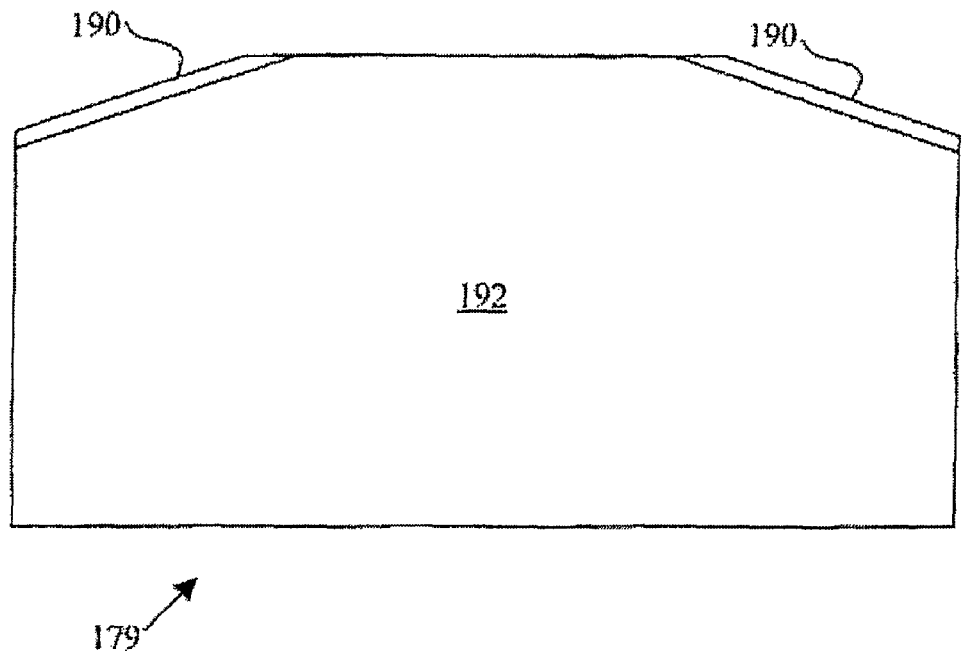
FIG. 11 is a front view of the composite plastic spherical mirror illustrated in FIG. 10.

Referring now to FIG. 11, a front view of mirror 179 is shown. When light is directed toward the front face 192 of the mirror 179, the aluminum layer 184 will reflect it. As shown, the upper corners of mirror 179 are beveled as indicated at 190 to minimize the footprint and enable the housing to be smaller.

In view of the above description, it should be apparent that the present invention may be mass produced at low cost and may be readily incorporated into most applications from use as a display for use with a desktop computer to providing customer service functions at checkout counters or service kiosks.

While certain exemplary preferred embodiments have been described and shown in the accompanying drawings, it is to be understood that such embodiments are merely illustrative of and not restrictive on the broad invention. Further, it is to be understood that this invention shall not be limited to the specific construction and arrangements shown and described since various modifications or changes may occur to those of ordinary skill in the art without departing from the spirit and scope of the invention as claimed.

What is claimed is:

1. An aerial projection system, comprising:
a housing;
a video source, mounted in a first portion of said housing for generating a three-dimensional image, comprising a display panel having a plurality of individually controllable pixels with low transmissivity between pixels and a backlight for generating light to form an aerial image;
controller means for controlling said video source to achieve a background color of zero red, zero green and zero blue when forming an image on a portion of said video display device;
a beam splitter mounted in said housing in optical alignment with said video source;
a plastic spherical mirror, mounted in a second portion of said housing in optical alignment with said beam splitter such that a portion of light from said video source is directed to said plastic spherical mirror, the plastic spherical mirror comprising:
a plastic part, comprising a mirror surface supported by a plurality of wall structures onto an edge of a mirror edge, wherein the mirror surface comprises a sphericity and an optical grade finish:
a thin layer comprised of a reflective metal coating deposited onto the mirror surface of the plastic part;
a protective overcoat formed onto the mirror surface; and
a polarizer, aligned parallel to said beam splitter, in said second portion of said housing so that said portion of light is transmitted out of said housing to form said aerial image.

2. The aerial projection system of claim 1 wherein said backlight comprises a light source generating at least 3,600 Lumens.

3. The aerial projection system of claim 2 further comprising a light shield surrounding an edge of said display panel and a contrast ratio of at least 400:1.

4. The aerial projection system of claim 3, wherein said video source comprises a high bright superblack LCD having a narrow field of view to reduce disbursement of off-axis light and to substantially focus light in a forward direction.

5. The aerial projection system of claim 4 wherein said dimension of said LCD is proportional to a dimension of said plastic spherical mirror.

6. The aerial projection system of claim 1, wherein said video source comprises a display panel having a plurality of individually controllable pixels; a controller for maintaining selected pixels at a state corresponding to super-black; and a light source generating at least 3,600 Lumens.

7. The aerial projection system of claim 6 wherein said superblack state comprises at least twenty darkest shades achievable by said display panel.

8. The aerial projection system of claim 6 wherein said superblack state comprises at least darkest two percent (2%) of dark shades achievable by said display panel.

9. The aerial projection system of claim 1, wherein the plastic part comprises a plastic material formulation selected based upon the ability to meet a plurality of performance criteria relating to material strength, thermal stability, water absorption, mold shrinkage, material flow into the mold, UL recognition, manufacturing considerations, surface density, lubricant content, and scratch resistance.

10. The aerial projection system of claim 9, wherein the plastic material formulation is selected from the group consisting of an optical-grade polycarbonate, a natural-grade polycarbonate, a UV-grade polycarbonate, a polyetherimide, a glass-filled grade polyetherimide, and a PMMA (acrylic).

11. The aerial projection system of claim 1 wherein said backlight comprises a full spectrum light source generating at least 3,600 Lumens.

12. The aerial projection system of claim 11, further comprising a second display panel positioned proximate to said video source, wherein said second display panel separately controllable to form an image for aerial display in combination an image formed by said video source.

13. The aerial projection system of claim 1, wherein said plastic spherical mirror comprises a plurality of injection gates.

14. The aerial projection system of claim 1, further comprising a plurality of support walls disposed in the plastic part so that the final design dimensions of the plastic part matches with a glass counterpart.

15. The aerial projection system of claim 1 wherein said polarizer comprises an antireflective coating on a surface of said polarizer facing away from said beam splitter.

16. The aerial projection system of claim 1, further comprising a transparent imaging device proximate to said second portion of said housing, said imaging device controllable for displaying video information, a portion of said image device adapted for passing said aerial image from said housing into a region of space beyond said imaging device.

17. The aerial projection system of claim 1 further comprising a frame surrounding an edge portion of said display screen to minimize the visibility of said display screen to an observer of said aerial image.

18. The aerial projection system of claim 1, wherein said video source comprises:
    a prism for collecting off-axis light from said backlight and re-directing said off-axis light through said display panel;
    means for filtering high frequency components of the light;
    means for collimating light exiting said display panel; and
    a polarizer having a layer of anti-reflective coating on the surface oriented away from said display panel.

19. The aerial projection system of claim 1, wherein said housing comprises a lightweight tubular frame including a plurality of cross-members for mounting said beam splitter and mirror in optical alignment with said video source; and a facade attached to said frame for shielding an interior of said housing from external ambient light sources.

* * * * *